United States Patent
Lee et al.

(10) Patent No.: US 7,295,778 B2
(45) Date of Patent: Nov. 13, 2007

(54) WAVELENGTH DIVISION MULTIPLEXED PASSIVE OPTICAL NETWORK SYSTEM

(75) Inventors: Jea-Hyuck Lee, Anyang-shi (KR); Seong-Taek Hwang, Pyongtaek-shi (KR); Yun-Je Oh, Yongin-shi (KR); Dae-Kwang Jung, Suwon-shi (KR)

(73) Assignee: Samsung Electronics Co., Ltd., Maetan-Dong, Yeongtong-Gu, Suwon-Si, Gyeonggi-Do (KR)

( * ) Notice: Subject to any disclaimer, the term of this patent is extended or adjusted under 35 U.S.C. 154(b) by 620 days.

(21) Appl. No.: 10/713,393

(22) Filed: Nov. 14, 2003

(65) Prior Publication Data
US 2004/0175177 A1 Sep. 9, 2004

(30) Foreign Application Priority Data
Mar. 5, 2003 (KR) ............ 10-2003-0013573

(51) Int. Cl.
H04J 14/00 (2006.01)
(52) U.S. Cl. .................. 398/72; 398/63
(58) Field of Classification Search ............ 398/58, 398/66, 67, 68, 69, 70, 71, 72, 73, 63
See application file for complete search history.

(56) References Cited

U.S. PATENT DOCUMENTS

| | | | | |
|---|---|---|---|---|
| 5,523,879 A * | 6/1996 | Ota | ............ | 359/333 |
| 5,712,716 A * | 1/1998 | Vanoli et al. | ............ | 398/34 |
| 6,697,414 B1 * | 2/2004 | Kato et al. | ............ | 372/102 |

FOREIGN PATENT DOCUMENTS

| | | |
|---|---|---|
| JP | 08-008878 | 1/1996 |
| JP | 2001-053655 | 2/2001 |
| JP | 2001-094205 | 4/2001 |
| JP | 2003-283465 | 10/2003 |

\* cited by examiner

*Primary Examiner*—Christina Leung
(74) *Attorney, Agent, or Firm*—Cha & Reiter, LLC

(57) ABSTRACT

Disclosed is a wavelength division multiplexed passive optical network (WDM PON) system including a central office, a remote Node, and an optical fiber coupled between the central office and the remote node, wherein the central office includes an optical power splitter coupled to the optical fiber, wherein the optical power splitter (1) divides an upstream optical signal from the optical fiber into a plurality of upstream optical signals having substantially similar power and (2) outputs downstream optical signals to the optical fiber, and a plurality of optical transceiver modules to (1) receive the plurality of upstream optical signals, and (2) output the downstream optical signals to the optical power splitter, and wherein at least one of the optical transceiver modules having an optical transmitter including a semiconductor optical amplifier and a reflection-type optical fiber grating located at a predetermined distance from the semiconductor optical amplifier, the optical transmitter transmitting light of a pre-set wavelength resonating between the SOA and reflection-type optical fiber grating; and wherein at least one of the optical transceiver modules having an optical receiver having an optical fiber grating for transmitting light of a predetermined wavelength and an optical detector for detecting light passing through the optical fiber grating.

13 Claims, 5 Drawing Sheets

WAVELENGTH DIVISION MULTIPLEXED PASSIVE OPTICAL NETWORK SYSTEM

CLAIM OF PRIORITY

This application claims priority to an application entitled "WAVELENGTH DIVISION MULTIPLEXED PASSIVE OPTICAL NETWORK SYSTEM," filed in the Korean Intellectual Property Office on Mar. 5, 2003 and assigned Serial No. 2003-13573, the contents of which are hereby incorporated by reference.

BACKGROUND OF THE INVENTION

1. Field of the Invention

The present invention relates to a communication system using a passive optical network (PON), and more particularly to a communication system using a wavelength division multiplexed passive optical network (WDM PON).

2. Description of the Related Art

A number of architectures and methods have been proposed to configure a subscriber network from a central office to buildings or general homes, such as x-Digital Subscriber Line (xDSL), Hybrid Fiber Coax (HFC), Fiber To The Building (FTTB), Fiber To The Curb (FTTC), and Fiber To The Home (FTTH), and the like.

The above FTTB, FTTC and FTTH, hereinafter collectively "FTTx," can be classified into two categories. First, an active FTTx configured by an active optical network (AON). Second, a passive FTTx configured by a passive optical network (PON). The PON is proposed as a cost-effective optical network for the near future. The PON is based on a communication network architecture having a point-to-multipoint topology based on passive devices. Thus, the PON has the flexibility meet increased communication demand and provide stable communication services to a plurality of subscribers. This is accomplished with the development and supply of various communication media and high-definition and large-capacity digital media technologies such as digital satellite broadcast, and the like.

The PON has a subscriber network architecture that forms a tree-type distribution topology. It couples one optical line terminal (OLT) to a plurality of optical network units (ONUs) through a 1×N passive optical splitter. Such a PON includes a remote node (RN) for dividing a downstream optical signal received from a central office (CO), acting as a conduit for a service provider, into multiple signals. The PON also transmits the multiple signals to the respective subscribers. Moreover, the CO is coupled to the RN over a single optical fiber. The RN is coupled to the subscribers over independent optical channels. PON systems may be based on time division multiplexing (TDM) or wavelength division multiplexing (WDM).

TDM divides the bandwidth of a link into separate channels or time slots. In TDM, subscribers must carry out a synchronization operation in the CO, according to a time criterion. More particularly, when communication demand increases, the TDM mechanism cannot easily meet the increased communication demand due to technical and economical factors. In contrast, WDM enables the CO to simultaneously transmit data items having different wavelengths to the subscribers. In WDM, each of the subscribers can carry out two-way communications using an assigned wavelength signal.

FIG. 1 is a block diagram illustrating a conventional wavelength division multiplexed passive optical network (WDM PON) system. Referring to FIG. 1, the conventional WDM PON system includes a central office (CO) 110, an optical fiber 140, a remote node (RN) 120 and a plurality of subscribers 130.

The CO 110 includes a' plurality of optical transmitters 111 for outputting downstream optical signals that are transmitted to the subscribers 130, a multiplexer/demultiplexer (MUX/DEMUX) 113, and a plurality of optical receivers 112. In a conventional WDM PON system each of the subscribers 130 performs two-way communications using a specific assigned wavelength. Thus, confidential communication security is ensured, and if desired, the communication network can be easily and promptly extended.

As shown in FIG. 1, the optical transmitters 111 output downstream optical signals having a range of wavelengths $\lambda_1 \sim \lambda_n$ to the MUX/DEMUX 113. The MUX/DEMUX 113 multiplexes the downstream optical signals and then outputs the multiplexed downstream optical signals to the RN 120.

Light sources for the optical transmitters 111 include: (1) coherent laser light sources such as a distributed feedback laser array, (2) Multi-Frequency Laser (MFL), (3) spectrum-sliced light source, (4) mode-locked Fabry-Perot laser with incoherent light, and the like.

The distributed feedback laser array, MFL, etc. has a comprehensive range of selectable wavelengths. However, the distributed feedback laser array must include a separate device for ensuring wavelength selectivity and stability. In contrast, the Fabry-Perot laser light source, etc. has a limited range of selectable wavelengths. However, it can easily produce coherent light, but cannot provide multiple channels. Furthermore, the Fabry-Perot laser light source is seriously degraded in performance due to a mode partition noise. This results from the Fabry-Perot laser light source modulating a spectrum division signal and then transmitting the modulated signal at a high speed.

Incoherent light sources such as a light emitting diode (LED), a super-luminescent LED, etc. other than the above-described coherent light sources have a comprehensive range of available wavelengths and are inexpensive. However, since the modulation bandwidth for the incoherent light sources is narrow and output power for the incoherent light sources is low, incoherent light sources are inadequate for performing long-distance communication.

To address these problems, a method for employing an optical fiber amplifier for generating amplified spontaneous emission (ASE) light as a light source, etc has been proposed. However, when the ASE light source is used, a separate external modulator such as $LiNbO_3$, etc. must also be provided.

The optical receivers 112 are configured by photodiodes, etc. They convert upstream signals received through the MUX/DEMUX 113 into electric signals.

The MUX/DEMUX 113 can be configured using a wavelength division multiplexer such as an arrayed waveguide grating (AWG), etc. The MUX/DEMUX 113 includes a first port located at one end coupled to the optical fiber 140, and a plurality of second ports located at the other end. The MUX/DEMUX 113 outputs an upstream optical signal from the first port to the second ports. It also outputs downstream optical signals from the second ports to the first port. However, since such an AWQ etc. changes or shifts wavelengths in response temperature, there must be a separate temperature control device for controlling the AWG's temperature. Consequently, the size of the system and its manufacturing cost are increased.

The RN 120 is located between the CO 110 and the each subscriber 130. It demultiplexes a downstream optical signal received from the CO 110 into multiple downstream channels. Thereafter, it transmits the multiple downstream channels to the subscribers 130. Furthermore, the RN 120 multiplexes upstream optical signals received from the subscribers 130 and transmits the multiplexed upstream optical signals to the CO 110. The RN 120 is configured by a wavelength division demultiplexer/multiplexer (DEMUX/MUX) such as an AWC; and the like.

Each subscriber 130 includes an optical transmitter 132 and an optical receiver 131 for receiving a corresponding downstream optical signal from the RN 120.

Optical receivers 131 can be configured by photodiodes. The optical receivers 131 convert downstream optical signals having wavelengths $\lambda_1 \sim \lambda_n$ received through the RN 120 into electric signals.

Optical transmitters 132 use coherent light sources of laser diodes, etc. They use a range of wavelengths different from the range of wavelengths of the downstream optical signals. In particular, the upstream optical signals are outputted from the laser diodes having a range of wavelengths $\lambda_{n+1} \sim \lambda_{2n}$.

In conventional WDM PON systems, a CO assigns different wavelengths to respective subscribers. In this manner communication security is ensured and the performance of such a WDM PON system can be enhanced. Furthermore, since the WDM PON system uses laser diodes, the optical-energy density is high, long-distance communication can be performed, and wavelength selectivity can be enhanced. However, the WDM PON system must be equipped with a separate external modulator or a separate device for enhancing wavelength stability and selectivity. Thus, the size of the WDM PON system is increased and the WDM PON system cannot be implemented cost-effectively. Further, since such a WDM PON system must be equipped with separate devices to ensure selectivity between wavelengths to perform long-distance communication and ensure multiple channels, subscribers must share expenses.

SUMMARY OF THE INVENTION

Therefore, the present invention has been made to reduce or overcome the above problems. One object of the present invention to provide a cost-effective wavelength division multiplexed passive optical network (WDM PON) system.

In accordance with one aspect of the present invention, a wavelength division multiplexed passive optical network (WDM PON) system is provided, the system comprising: a central office, a remote Node, and an optical fiber coupled between the central office and the remote node, wherein the central office includes an optical power splitter coupled to the optical fiber, wherein the optical power splitter (1) divides an upstream optical signal from the optical fiber into a plurality of upstream optical signals having substantially similar power and (2) outputs downstream optical signals to the optical fiber, and a plurality of optical transceiver modules to (1) receive the plurality of upstream optical signals, and (2) output the downstream optical signals to the optical power splitter, and wherein at least one of the optical transceiver modules having an optical transmitter including a semiconductor optical amplifier and a reflection-type optical fiber grating located at a predetermined distance from the semiconductor optical amplifier, the optical transmitter transmitting light of a pre-set wavelength resonating between the SOA and reflection-type optical fiber grating; and wherein at least one of the optical transceiver modules having an optical receiver having an optical fiber grating for transmitting light of a predetermined wavelength and an optical detector for detecting light passing through the optical fiber grating.

BRIEF DESCRIPTION OF THE DRAWINGS

The present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the annexed drawings. Further, in the following description of the present invention, a detailed description of known functions and configurations incorporated herein will be omitted when it may make the subject matter of the present invention rather unclear.

Figure 1:
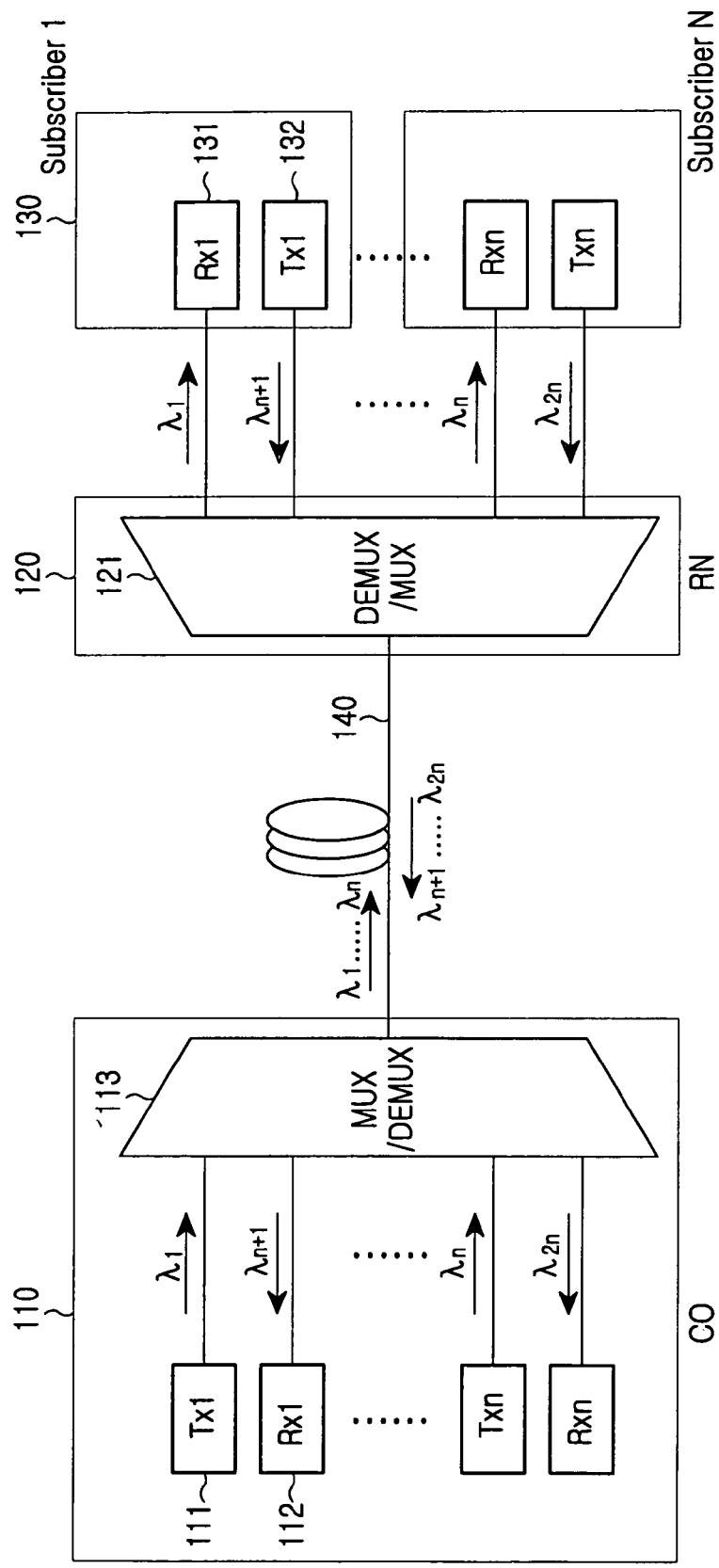
FIG. 1 is a block diagram illustrating a conventional wavelength division multiplexed passive optical network (WDM PON) system.
Figure 2:
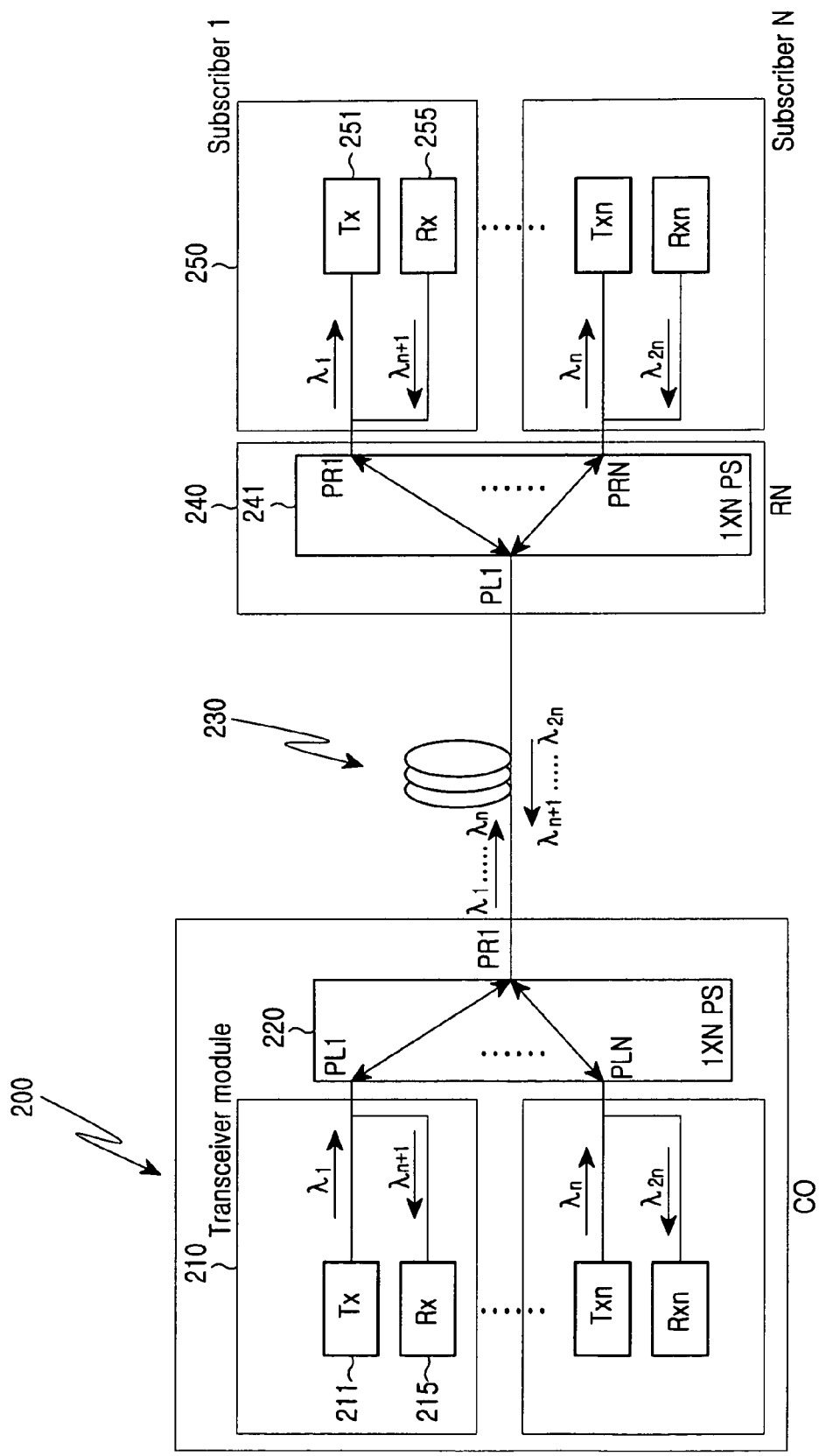
FIG. 2 is a block diagram illustrating a WDM PON system in accordance with the present invention.

FIG. 2 is a block diagram illustrating a WDM PON system in accordance with the present invention. Referring to FIG. 2, the WDM PON system includes a central office CO) 200, an optical fiber 230, an remote node (RN) 240 and a plurality of subscribers 250.

The CO 200 includes an optical power splitter (PS) 220 and optical transceiver modules 210. The optical PS 220 includes a first port located at one end and coupled to the optical fiber 230, and a plurality of second ports located at the other end. The optical PS 220 divides an upstream optical signal received from the first port into multiple upstream optical signals. The multiple upstream optical signals have substantially similar same power. The optical PS 220 then outputs the multiple upstream optical signals through the multiple second ports. The optical PS 220 outputs downstream optical signals received from the second ports to the first port. The optical PS 220 can be configured using a 1×N beam splitter.

Each optical transceiver module 210 is coupled to a corresponding second port. Each optical transceiver module 210 receives an upstream optical signal from the second port. The optical transceiver modules 210 output a downstream optical signal to the second ports.

Figure 3:
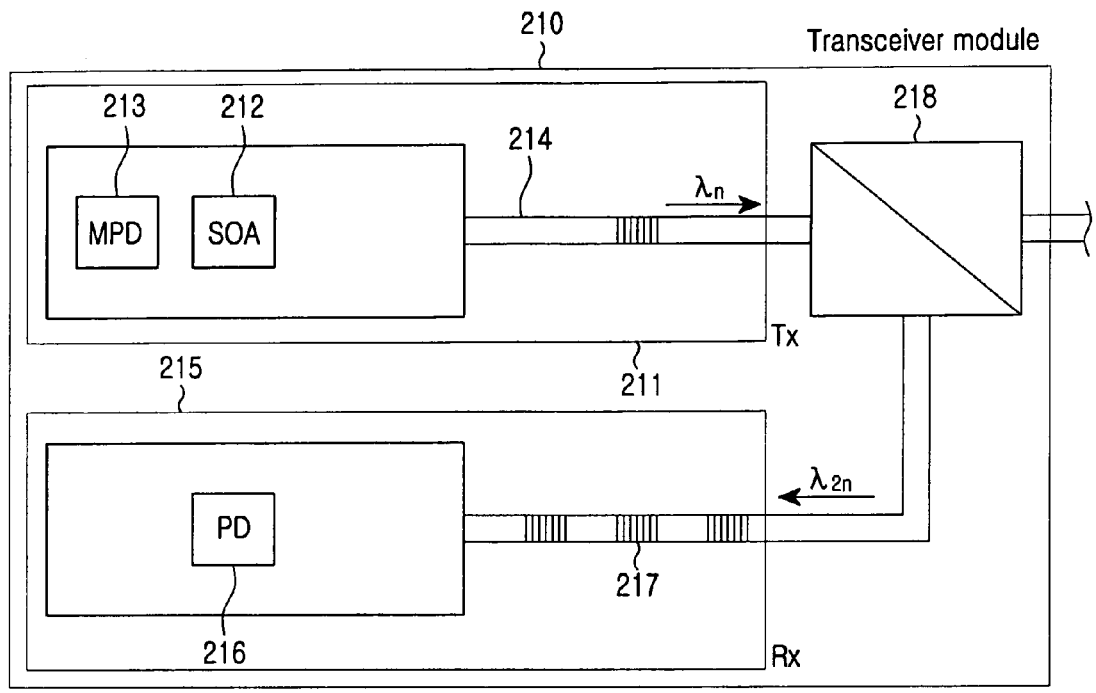
FIG. 3 is a view illustrating one of the optical transceiver modules shown in FIG. 2.

FIG. 3 is a view illustrating one of the optical transceiver modules 210 shown in FIG. 2. Referring to FIG. 3, the optical transceiver module 210 includes an optical transmitter 211, an optical receiver 215 for detecting an upstream optical signal, and a wavelength selectable coupler 218.

The optical transmitter 211 includes (1) a semiconductor optical amplifier (SOA) 212 as a light source, (2) a reflection-type optical fiber grating 214 coupled to the second port and located at a pre-set distance from the SOA 212, and (3) a monitoring photodiode (MPD) 213 for monitoring the intensity of light from the SOA 212. Furthermore, the optical transmitter 211 outputs light of a pre-set wavelength resonating between the SOA 212 and the optical fiber grating 214.

The optical fiber grating 214 is a reflection-type fiber amplifier forming a Bragg grating pattern for reflecting only light of a predetermined wavelength.

One surface of the SOA 212 forms a highly reflective layer. Light from the SOA 212 is repeatedly reflected between the optical fiber grating 214 and the SOA 212 and has a predetermined light intensity. An incoherent light source such as an LED, etc. can be used in place of the SOA 212. The optical fiber grating 214 has a Bragg grating pattern. The optical fiber grating 214 cannot completely reflect the light, and thus, allows part of the light to be transmitted. Consequently, the SOA 212, having a highly reflective layer formed on one surface, and the optical fiber grating 214 serve as an optical resonator for a Fabry-Perot laser's etalon or laser light source. The optical fiber grating 214 adjusts a grating period and the distance between the optical fiber grating 214 and the SOA 212. In this manner, the optical fiber grating 214 can enhance wavelength selectivity capable of selecting only the optical signal of a predetermined wavelength.

The optical receiver 215 is coupled to the second port. It includes a transmission-type optical fiber grating 217 for transmitting light of a predetermined wavelength and an optical detector 216 for detecting light passing through the optical fiber grating 217. The optical detector 216 uses a photodiode (PD), and the like. The optical fiber grating 217 uses a long-period optical fiber grating capable of selectively transmitting only the optical signal of a predetermined wavelength.

Referring to FIGS. 2 and 3, the wavelength selectable coupler 218 outputs a downstream optical signal received from the optical transmitter 211 to the optical PS 220 through the second port. It also inputs an upstream optical signal received through the second port of the optical PS 220 into the optical receiver 215. The wavelength selectable coupler 218 can use an optical waveguide based on a Y-branch structure, and the like. The wavelength selectable coupler 218 distributes the downstream optical signal from the optical transmitter 211 and the upstream optical signal received from the RN 240.

Figure 5:
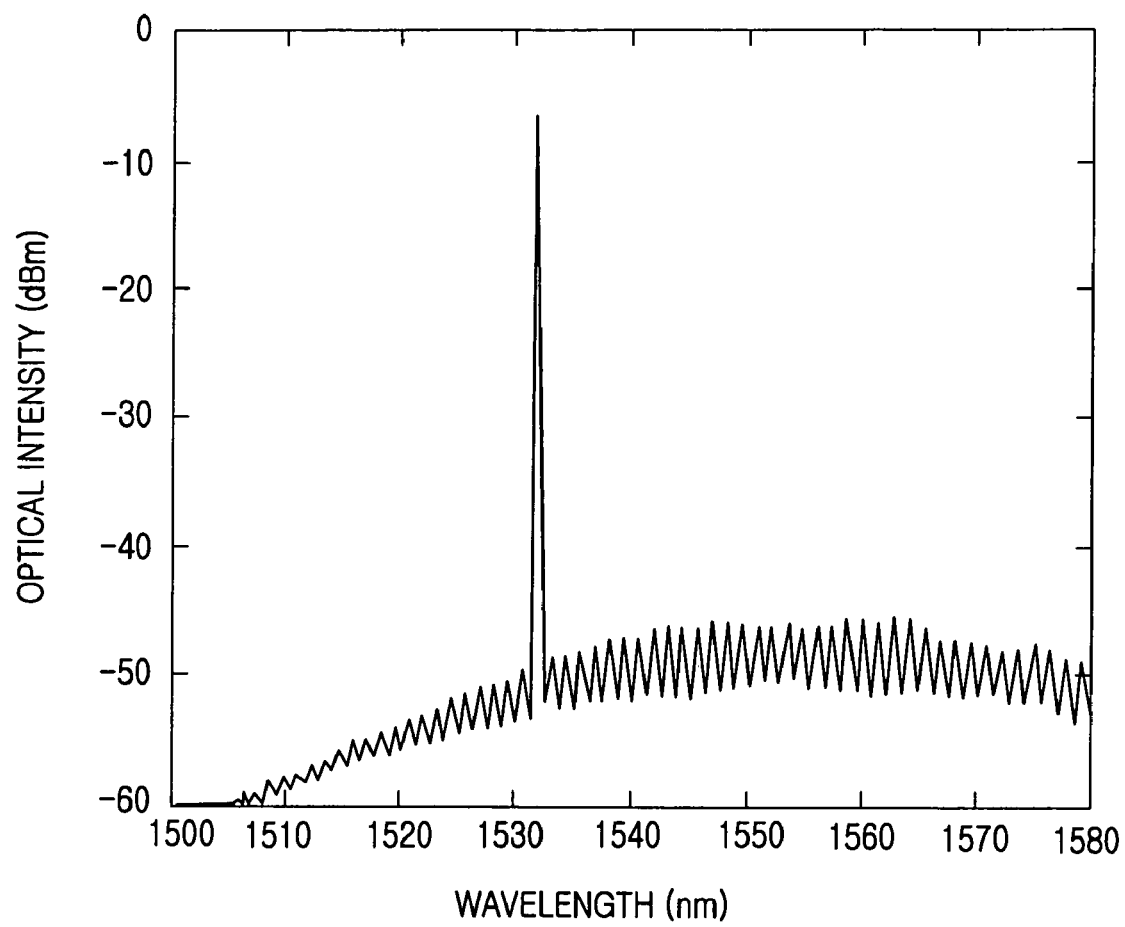
FIG. 5 is a graph illustrating an exemplary optical spectrum of light outputted from an optical transmitter in accordance with the present invention.

The upstream and downstream optical signals use light components of different wavelength ranges. For example, the downstream optical signals use light components having a range of wavelengths $\lambda_1 \sim \lambda_n$. The upstream optical signals use light components having a range of wavelengths $\lambda_{n+1} \sim \lambda_{2n}$. Accordingly, when the downstream optical signals use light of the 1550 nm wavelength range, the upstream optical signals use light of the 1310 mm wavelength range. FIG. 5 is a graph illustrating an exemplary optical spectrum of light from the optical transmitter in accordance with the present invention.

The RN 240 divides the downstream optical signal received from the CO 200 into multiple downstream optical signals having substantially the same power. It then transmits the downstream optical signals to the subscribers 250. The upstream optical signals received from the subscribers 250 are outputted to the CO 200. The RN 240 uses an optical power splitter (PS) 241 that includes a first port located at one end coupled to the CO 200 and the optical fiber 230 and a plurality of second ports located at the other end coupled to the subscribers 250.

Figure 4:
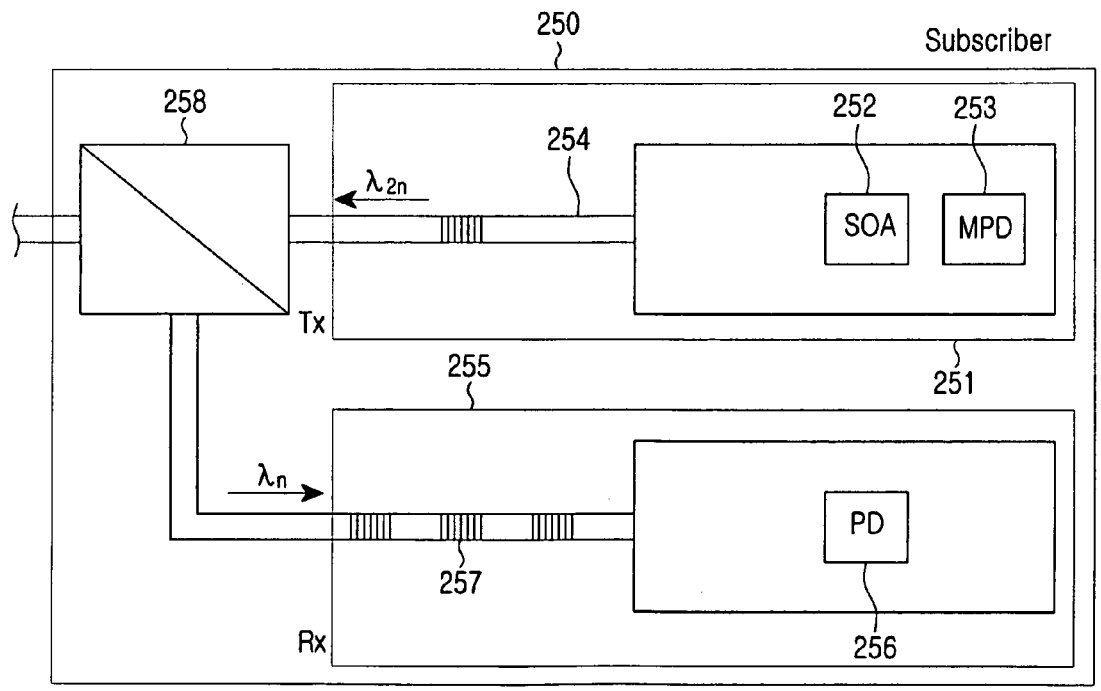
FIG. 4 is a view illustrating a subscriber shown in FIG. 2.

FIG. 4 is a view illustrating the subscriber 250 shown in FIG. 2. Referring to FIG. 4, the subscriber 250 includes an optical receiver 255 for receiving one of the equally power-divided downstream optical signals from the RN 240, an optical transmitter 251 for outputting an upstream optical signal, and a wavelength selectable coupler 258.

The optical transmitter 251 includes a semiconductor optical amplifier (SOA) 252 for generating light, a reflection-type optical fiber grating 254 located at a pre-set distance from the SOA 252, and a monitoring photodiode (MPD) 253 for monitoring an intensity of light outputted from the SOA 252. The optical transmitter 251 outputs light of a pre-set wavelength resonating between the SOA 252 and the optical fiber grating 254.

The optical receiver 255 includes a transmission-type optical fiber grating 257 for transmitting the downstream optical signals of a predetermined wavelength, and an optical detector 256, which is a PD, for detecting light passing through the optical fiber grating 257.

Figure 6:
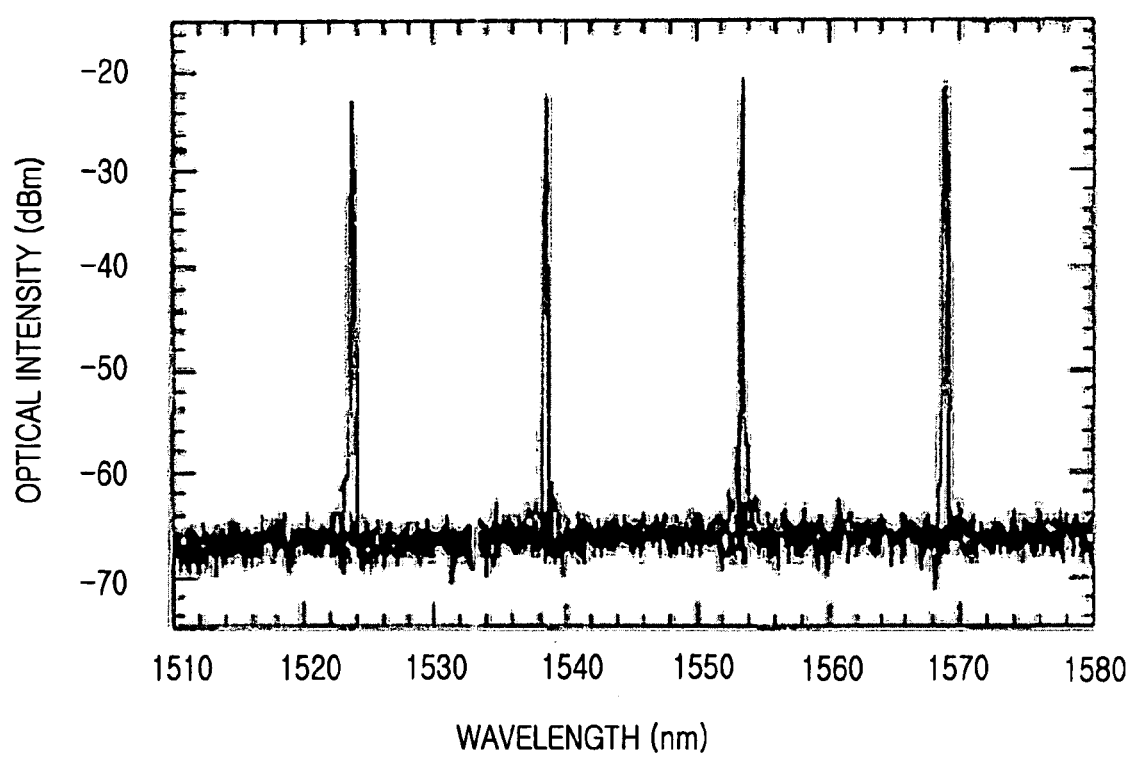
FIG. 6 is a graph illustrating an exemplary optical spectrum on the WDM PON system in accordance with the present invention.

The wavelength selectable coupler 258 sends a downstream optical signal received from the RN 240 to the optical receiver 255. It also sends an upstream optical signal received from the optical transmitter 251 to the RN 240. The wavelength selectable coupler 258 uses an optical waveguide based on a Y branch structure, and the like. FIG. 6 is a graph illustrating an optical spectrum distribution according to a range of light wavelengths.

In the PON system in accordance with the present invention, an optical transmitter serves as a resonator by adjusting the distance between an incoherent light source, such as an SOA or LED, and an optical fiber grating, based on a Bragg grating pattern. Thus, the system-manufacturing costs are reduced, and the optical output characteristics and linewidth characteristics are not degraded. Furthermore, the PON does not use an AWG along with a separate temperature control device. Accordingly, the size of a system and its manufacturing cost can be reduced.

Advantageously, the present invention provides a WDM PON system, which can enhance optical amplification and wavelength selectivity without a separate wavelength stabilization device, with a reflection-type optical fiber grating and SOA having a resonator function.

Furthermore, the WDM PON system can be implemented without an AWG along with a separate temperature control device. In contrast, the WDM PON employs an optical fiber grating capable of selecting only a predetermined wavelength and an optical power splitter capable of dividing an optical signal into multiple optical signals having the same power.

As a result, the present invention can provide the cost-effective WDM PON system, which can implement stable system performance without a light source and AWG used in conventional WDM PON systems.

Although the preferred embodiments of the present invention have been disclosed for illustrative purposes, those skilled in the art will appreciate that various modifications, additions and substitutions are possible, without departing from the scope of the invention. Therefore, the present invention is not limited to the above-described embodiments, but the present invention is defined by the claims which follow, along with their full scope of equivalents.

What is claimed is:

1. A wavelength division multiplexed passive optical network system, comprising:
 a central office;
 a remote Node;
 an optical fiber coupled between the central office and the remote node, wherein the central office includes an optical power splitter coupled to the optical fiber, wherein the optical power splitter (1) divides an upstream optical signal from the optical fiber into a plurality of upstream optical signals having substantially similar power and (2) outputs downstream optical signals to the optical fiber; and a plurality of optical transceiver modules to (1) receive the plurality of upstream optical signals, and (2) output the downstream optical signals to the optical power splitter, and wherein at least one of the optical transceiver modules having an optical transmitter including a semiconductor optical amplifier and a reflection-type optical fiber grating located at a predetermined distance from the semiconductor optical amplifier, the optical transmitter transmitting light of a pre-set wavelength resonating between the SOA and reflection-type optical fiber grating; and wherein at least one of the optical transceiver modules having an optical receiver having an optical fiber grating for transmitting light of a predetermined wavelength and an optical detector for detecting light passing through the optical fiber grating.

2. The wavelength division multiplexed passive optical network system as set forth in claim 1, wherein the optical power splitter includes a first port coupled to the optical fiber.

3. The wavelength division multiplexed passive optical network system as set forth in claim 2, wherein the optical power splitter includes a plurality of second ports coupled to the optical transceiver modules.

4. The wavelength division multiplexed passive optical network system as set forth in claim 3, wherein the semiconductor optical amplifier is coupled to one of the plurality of second ports.

5. The wavelength division multiplexed passive optical network system as set forth in claim 3, wherein the optical power splitter further outputs the plurality of upstream optical signals to the plurality of second ports.

6. The wavelength division multiplexed passive optical network system as set forth in claim 5, wherein the remote node comprises an optical power splitter coupled to the and optical fiber.

7. The wavelength division multiplexed passive optical network system as set forth in claim 5, wherein the optical power splitter of the remote node includes a first port located coupled to the optical fiber, and a plurality of second ports.

8. The wavelength division multiplexed passive optical network system as set forth in claim 5, wherein at least one of the optical transceiver modules further comprises a wavelength selectable coupler to output a downstream optical signal from the optical transmitter to the optical power splitter through the second port, and inputting an upstream optical signal received through the second port into the optical receiver.

9. The wavelength division multiplexed passive optical network system as set forth in claim 1, wherein wavelengths of the downstream and upstream optical signals have different wavelength bands.

10. A wavelength division multiplexed passive optical network system, comprising:

a central office having an optical power splitter coupled to an optical fiber, the optical power splitter (1) dividing an upstream optical signal from the optical fiber into a plurality of upstream optical signals having substantially similar power and (2) outputting a downstream optical signal to the optical fiber;

a plurality of subscriber units to output upstream optical signals; and a remote node to divide the downstream optical signal received from the central office into multiple downstream optical signals having the same power, transmitting the multiple downstream optical signals to the subscriber units, and outputting the upstream optical signals received from the subscriber units to the central office, wherein at least one of the subscriber units comprises:

a first optical transmitter including an semiconductor optical amplifier and a reflection-type optical fiber grating located at a predetermined distance from the semiconductor optical amplifier, the optical transmitter transmitting an upstream optical signal of a pre-set wavelength resonating between the SOA and reflection-type optical fiber grating; and a first optical receiver including an optical fiber grating for transmitting only a downstream optical signal of a pre-set wavelength among the multiple downstream optical signals having the same power from the remote node and an optical detector for detecting light passing through the optical fiber grating.

11. The wavelength division multiplexed passive optical network system as set forth in claim 10, wherein the remote node comprises:

an optical Power Splitter including a first port coupled to the optical fiber, and a plurality of second ports, wherein the optical power splitter divides the downstream optical signal from the optical fiber into the multiple downstream optical signals having the same power, transmits the multiple downstream optical signals to the subscriber units through the second ports, and outputs the upstream optical signals received from the subscriber units to the optical fiber.

12. The wavelength division multiplexed passive optical network system as set forth in claim 10, wherein each of the subscriber units further comprises a wavelength selectable coupler to separately output the upstream optical signal received from the optical transmitter, and separately output the downstream optical signal received from the remote node to the optical receiver.

13. The wavelength division multiplexed passive optical network system as set forth in claim 10, wherein the central office further comprises:

a second optical transmitter including an semiconductor optical amplifier and a reflection-type optical fiber grating located at a predetermined distance from the semiconductor optical amplifier, the optical transmitter transmitting an upstream optical signal of a pre-set wavelength resonating between the SOA and reflection-type optical fiber grating; and a second optical receiver including an optical fiber grating for transmitting only a downstream optical signal of a pre-set wavelength among the multiple downstream optical signals having the same power from the remote node and an optical detector for detecting light passing through the optical fiber grating.

* * * * *